United States Patent [19]
Rydelek et al.

[11] Patent Number: 6,088,530
[45] Date of Patent: Jul. 11, 2000

[54] METHOD OF RECYCLING ONE-TIME-USE CAMERA

[75] Inventors: James G. Rydelek, Henrietta; William T. Matthias; Maureen E. Churan-King, both of Rochester; Randy E. Horning, LeRoy, all of N.Y.

[73] Assignee: Eastman Kodak Company, Rochester, N.Y.

[21] Appl. No.: 09/313,964

[22] Filed: May 18, 1999

[51] Int. Cl.$^7$ .................................................. G03B 17/02
[52] U.S. Cl. ................................................. 396/6; 396/538
[58] Field of Search .............................. 396/6, 535, 536, 396/538, 541

*Primary Examiner*—Howard B. Blankenship
*Attorney, Agent, or Firm*—Roger A. Fields

[57] ABSTRACT

A method of recycling a spent one-time-use camera that originally includes a pair of front and rear cover parts and a main body part having a chamber for a film cartridge, and which has had corresponding bottom portions of the front and rear cover parts and the main body part cut off to provide an opening for removing the film cartridge from the chamber, comprises the steps:

cutting off a further portion of the main body part in the vicinity of the first cut that was made to provide the opening for removing the film cartridge from the chamber, in order to provide an attachment edge along the main body part;

assembling a sacrificial bottom portion to the main body part at the attachment edge to replace the bottom and further portions that were cut off the main body part;

loading a fresh cartridge in the chamber; and assembling new front and rear cover parts without corresponding bottom portions being cut off to the main body part, in order to complete a recycled camera, whereby after the recycled camera is used the sacrificial bottom portion can first be cut off spaced from the attachment edge when the corresponding bottom portions of the new front and rear cover parts are cut off and the remainder of the sacrificial bottom portion can then be separated from the attachment edge to allow another sacrificial bottom portion to be assembled to the main body part.

6 Claims, 7 Drawing Sheets

METHOD OF RECYCLING ONE-TIME-USE CAMERA

CROSS-REFERENCE TO RELATED APPLICATION

Reference is made to commonly assigned co-pending application Ser. No. 09/313963, entitled METHOD OF UNLOADING FILM CARTRIDGE FROM ONE-TIME-USE CAMERA and filed May 18, 1999 in the names of Roger A. Fields, James G. Rydelek, William T. Matthias, Maureen E. Churan-King and Randy E. Horning.

FIELD OF THE INVENTION

The invention relates generally to the field of photography, and in particular to cameras. More specifically, the invention relates to a method of recycling a one-time-use camera and to a recyclable camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed film roll prewound from the film cartridge onto a film supply spool in a film supply chamber, a fixed-focus taking lens, a film metering mechanism with a rotatably supported metering sprocket that engages the filmstrip, a manually rotatable film winding thumbwheel rotatably engaged with a film take-up spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film take-up spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the latent images and make prints for the customer. At least some of the used camera parts may be recycled, i.e. reused, to remanufacture the camera.

Prior art U.S. Pat. No. 5,596,385 issued Jan. 21, 1997 discloses a method of opening a one-time-use camera to obtain the film cartridge with the exposed filmstrip. According to the method, a knife cuts away corresponding bottom portions of the front and rear cover parts and the main body part to make a bottom-most opening to the cartridge receiving chamber. Then, the film cartridge is removed from the cartridge receiving chamber through the opening. No method is suggested in the patent for recycling any of the used camera parts.

The Cross-Referenced Application

The cross-referenced application discloses a method of unloading a film cartridge with exposed film from a spent one-time-use camera that has a main body part with a chamber for the film cartridge and a pair of front and rear cover parts which house the main body part between them, said method comprising the steps:

cutting off light lock engaging corresponding bottom portions of the front and rear cover parts to provide an exterior cut bottom opening in the front and rear cover parts, without cutting the main body part, in order to leave an interior original bottom opening in the main body part in tact; and removing the film cartridge from the chamber through the interior original bottom opening and the exterior cut bottom opening, whereby the main body part may be recycled.

SUMMARY OF THE INVENTION

According to one aspect of the invention, a method of recycling a spent one-time-use camera that originally includes a pair of front and rear cover parts and a main body part having a chamber for a film cartridge, and which has had corresponding bottom portions of the front and rear cover parts and the main body part cut off to provide an opening for removing the film cartridge from the chamber, comprises the steps:

cutting off a further portion of the main body part in the vicinity of the first cut that was made to provide the opening for removing the film cartridge from the chamber, in order to provide an attachment edge along the main body part;

assembling a sacrificial bottom portion to the main body part at the attachment edge to replace the bottom and further portions that were cut off the main body part;

loading a fresh cartridge in the chamber; and assembling new front and rear cover parts without corresponding bottom portions being cut off to the main body part, in order to complete a recycled camera, whereby after the recycled camera is used the sacrificial bottom portion can first be cut off spaced from the attachment edge when the corresponding bottom portions of the new front and rear cover parts are cut off and the remainder of the sacrificial bottom portion can then be separated from the attachment edge to allow another sacrificial bottom portion to be assembled to the main body part.

According to another aspect of the invention, a recyclable one-time-use camera comprising a main body part having a chamber for a film cartridge, and a pair of front and rear cover parts that house the main body part between them, is characterized in that:

a sacrificial bottom portion of the main body part is engaged with the main body part at an attachment edge of the main body part to form a bottom-most portion of the chamber, and can be disengaged from the attachment edge to permit another sacrificial bottom portion to be engaged with the main body part at the attachment edge, whereby to unload the film cartridge from the chamber and recycle the camera the sacrificial bottom portion can first be cut off spaced from the attachment edge when corresponding bottom portions of the front and rear cover parts are cut off to provide an opening for removing the film cartridge from the chamber and the remainder of the sacrificial bottom portion can then be disengaged from the attachment edge to allow another sacrificial bottom portion to be connected to the main body

DETAILED DESCRIPTION OF THE INVENTION

Figure 1:
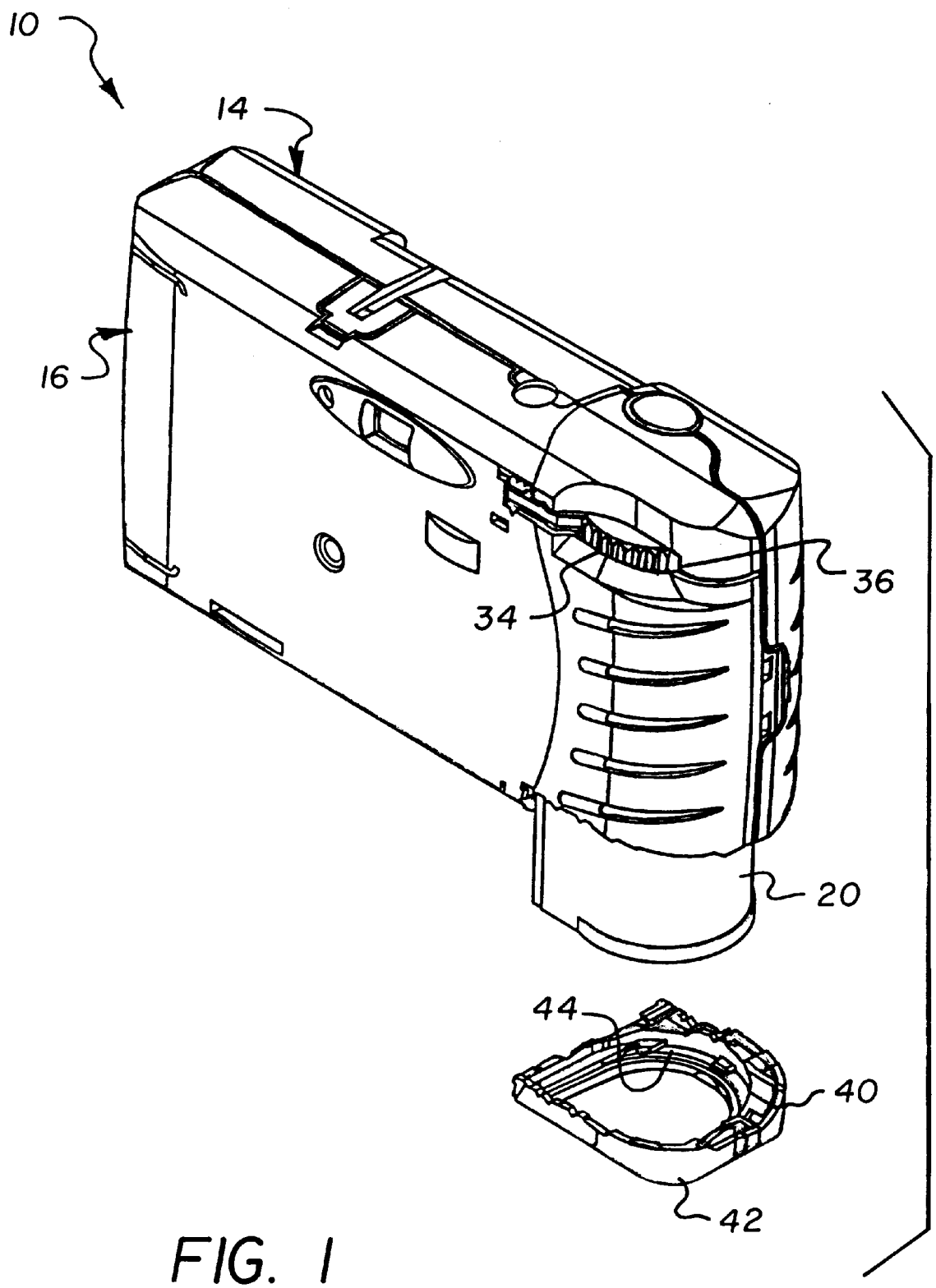
FIG. 1 is a rear perspective view of a one-time-use camera, showing corresponding bottom portions of the front and rear cover parts and the main body part cut off to provide an opening for removing the film cartridge from the cartridge receiving chamber.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–7 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected to one another and to the main body part 12 via known hook-in-hole connections such as thoroughly described in prior art U.S. Pat. No. 5,815,740 issued Sep. 29, 1998, and prior art U.S. Pat. No. 5,349,510 issued Sep. 20, 1994.

As is known, the main body part 12 has a rearwardly open cartridge receiving chamber 18 for a conventional 35 mm film cartridge 20 and a rearwardly open film supply chamber 22 that contains a rotatably supported film supply spool 24. See FIG. 2. During manufacture, a filmstrip 26 is prewound from the film cartridge 20 into an unexposed film roll 28 on the film supply spool 24. See FIG. 7. A rearwardly open backframe opening 30 is located between the cartridge receiving chamber 18 and the film supply chamber 22 for exposing successive frames of the filmstrip 26 when ambient light is received through a front aperture 32 in the main body part 12. See FIG. 4.

A film winding thumbwheel 34, rotatably supported on the main body part 12, protrudes outwardly from a slot 36 in the rear cover part 16 and has a depending coaxial stem (not shown) in coaxial engagement with an exposed top end 38 of a film take-up spool inside the film cartridge 20. Manual winding rotation of the film winding thumbwheel 34, counter-clockwise in FIG. 2, similarly rotates the film take-up spool inside the film cartridge 20 to wind each exposed frame of the filmstrip 26 into the film cartridge and to move a fresh frame of the filmstrip from the unexposed film roll 28 on the film supply spool 24 to the backframe opening 30.

When the maximum number of exposures available on the filmstrip 26 have been made, and the filmstrip is completely wound into the film cartridge 20, the one-time-use camera 10 must be opened to remove the film cartridge with the exposed filmstrip from the cartridge receiving chamber 18.

Figure 2:
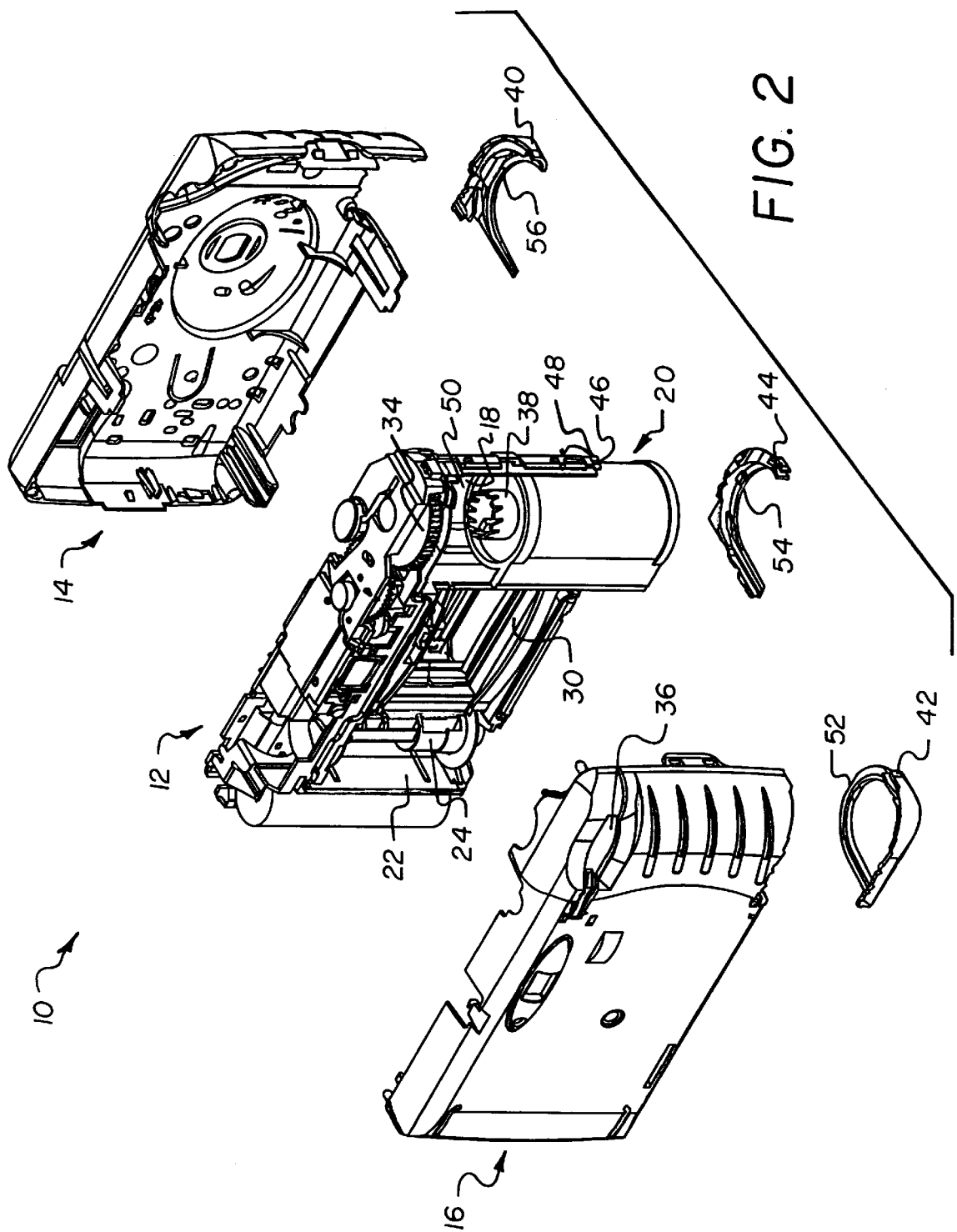
FIG. 2 is an exploded perspective view of the one-time-use camera as shown in FIG. 1.

Prior art U.S. Pat. No. 5,596,385 issued Jan. 21, 1997 discloses a method of opening the one-time-use camera 10 to obtain the film cartridge 20 with the exposed filmstrip. According to the method, a knife (not shown) cuts away corresponding bottom portions 40, 42, and 44 of the front and rear cover parts 14 and 16 and the main body part 12 to make a bottom-most opening 46 to the cartridge receiving chamber 18. Then, the film cartridge 20 is removed from the cartridge receiving chamber 18 through the bottom-most opening 46. This is depicted in FIGS. 1 and 2. When the bottom portion 44 of the main body part 12 is cut away, a jagged cut-edge 48 is formed along a curved wall 50 of the main body part which defines the cartridge receiving chamber 18. See FIG. 3.

The bottom portion 42 of the rear cover part 16 has a curved light lock rib 52 that is positioned between respective parallel curved light lock ribs 54 and 56 of the bottom portion 44 of the main body part 12 and the bottom portion 40 of the front cover part 14 to form a labyrinth light-trap that light-tightly seals the cartridge receiving chamber 18. See FIGS. 1 and 2.

Figure 3:
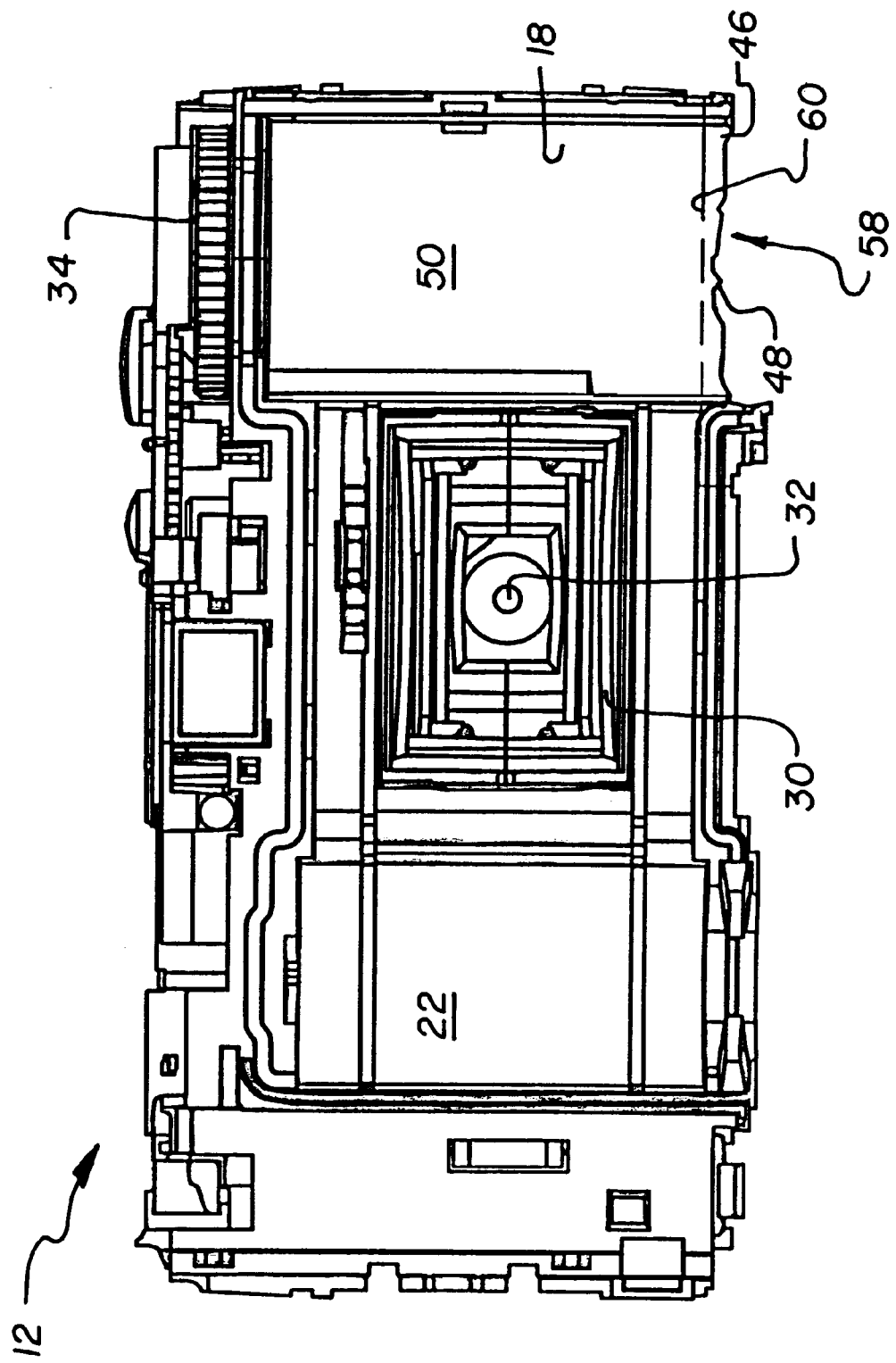
FIGS. 3, 4, 5, 6 and 7 depict a method of recycling the one-time-use camera.
Figure 4:
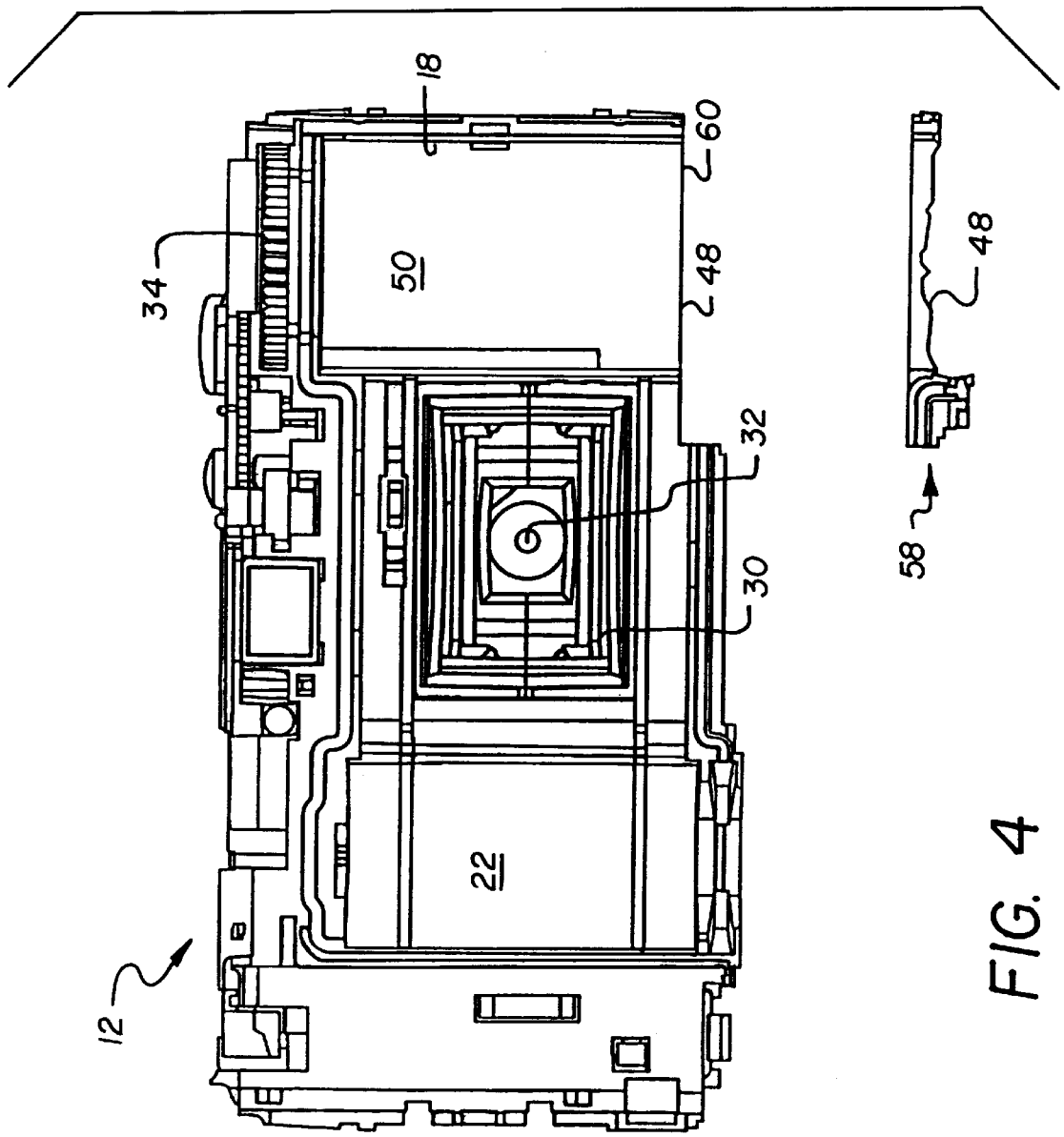
Figure 5:
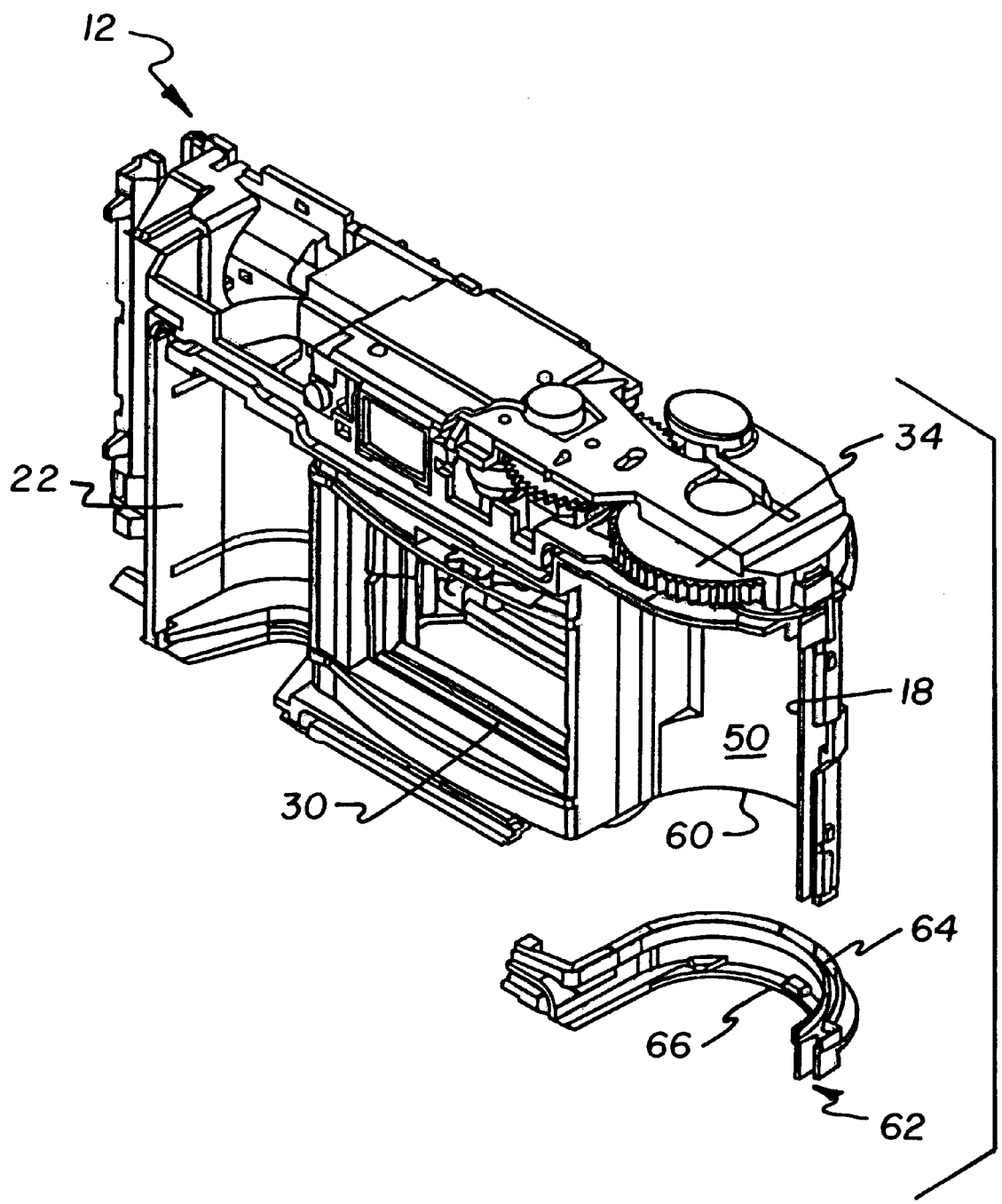
Figure 6:
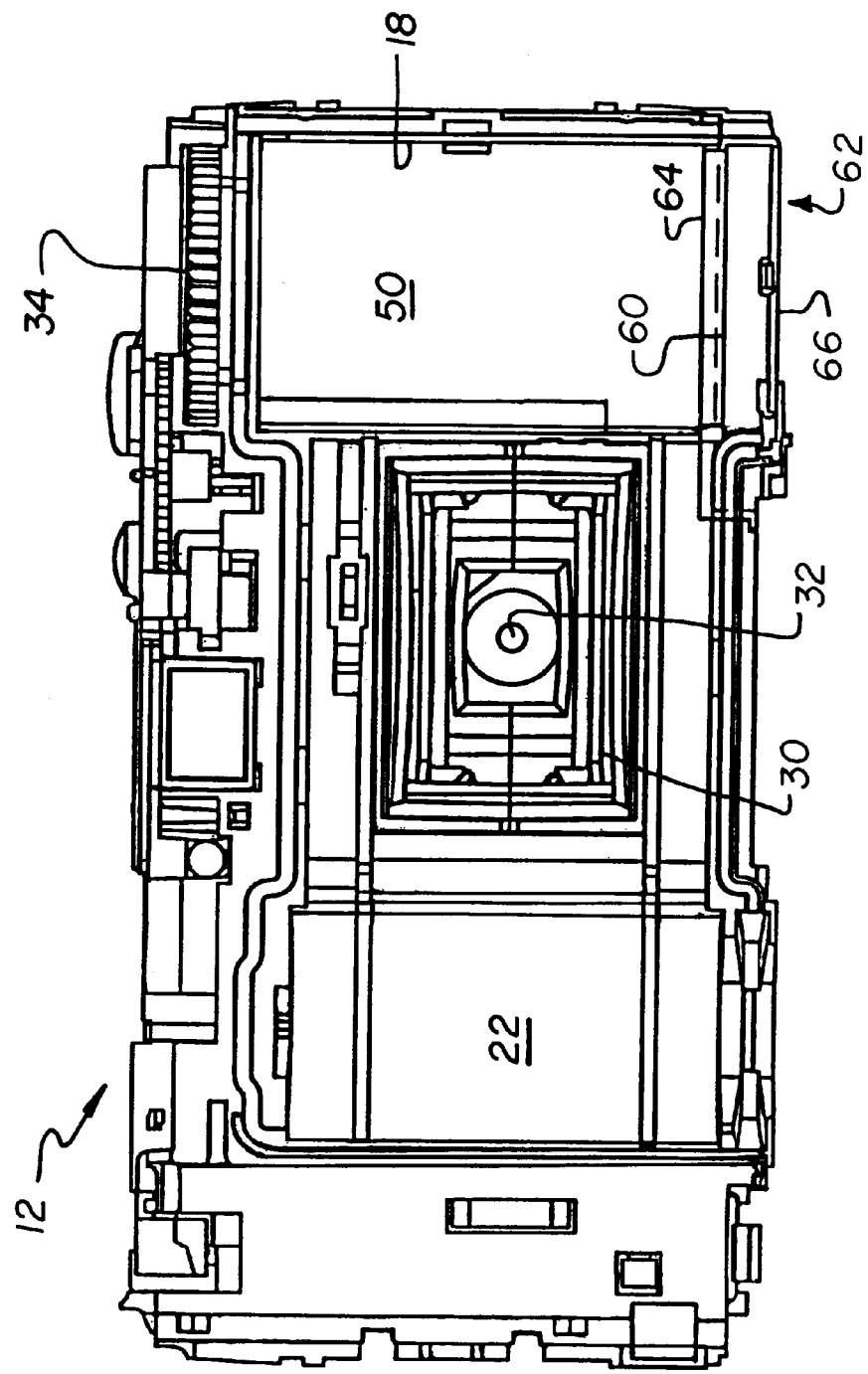
Figure 7:
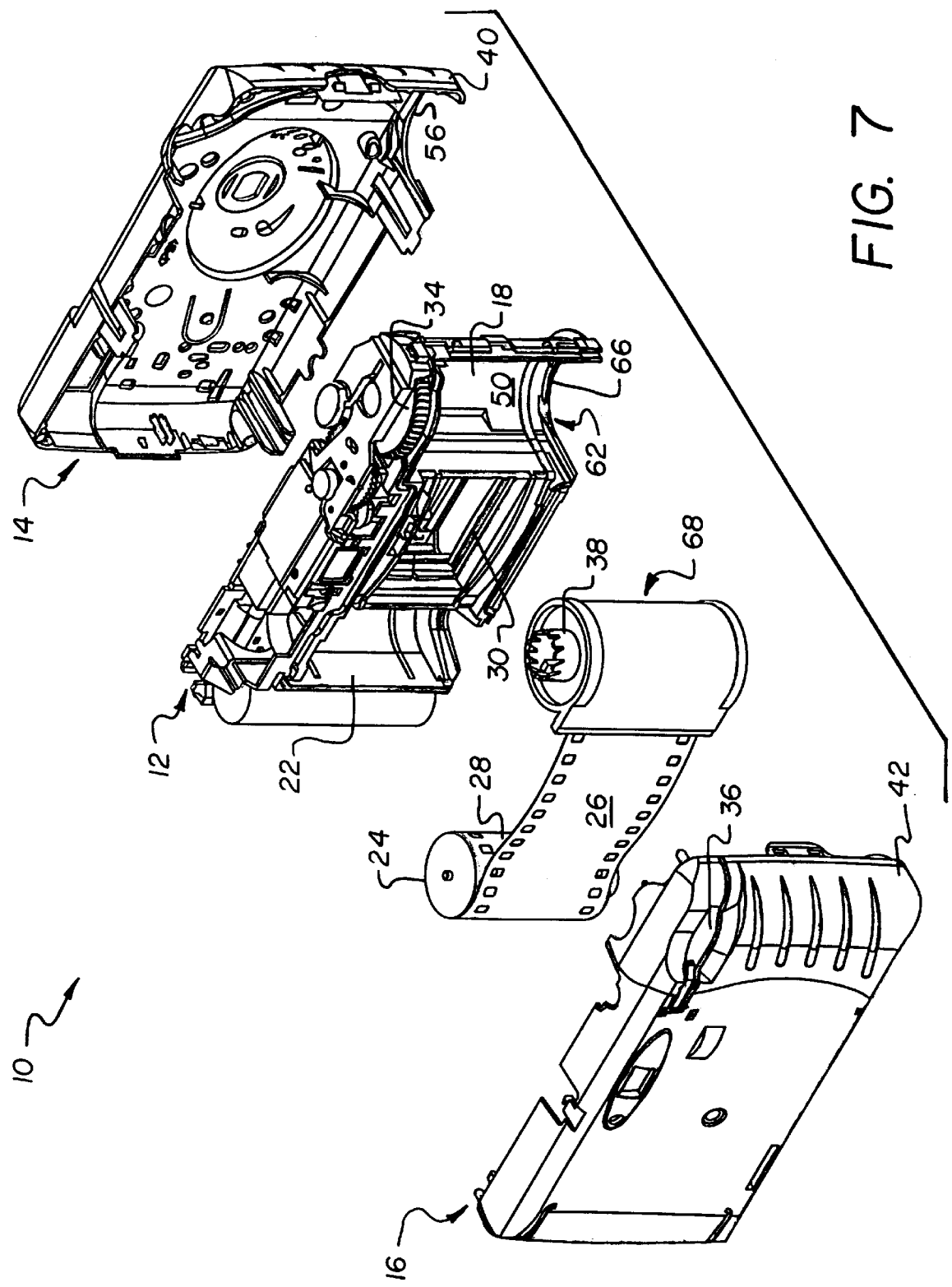

A preferred method of recycling the one-time-use camera 10 is as follows. A further bottom portion 58 of the main body part 12 which includes the (first cut) jagged cut-edge 48 along the curved wall 50 of the main body part 12 is cut away as shown in FIGS. 3 and 4. In this instance, however, it is done to provide a smooth (non-jagged) permanent attachment edge 60 along the curved wall 50.

Then, a sacrificial (replacement) bottom portion 62 is engaged (connected) with the curved wall 50 at the attachment edge 60 to replace the bottom and further portions 44 and 58 of the main body part 12 that were cut away. See FIGS. 5 and 6. The sacrificial bottom portion 62 is curved in conformity with the curved wall 50, and has a curved groove 64 that tightly receives the attachment edge 60 to engage the sacrificial bottom portion with the curved wall and to permit the sacrificial bottom portion to be readily disengaged from the curved wall. A curved light lock rib 66 of the sacrificial bottom portion 62 is identical to the curved light lock rib 54 of the bottom portion 44 of the main body part 12 that was cut away.

Then, a fresh cartridge 68 is loaded in the cartridge receiving chamber 18 and new front and rear cover parts 14 and 16 that are identical to the original front and rear cover parts are assembled to the main body part 12. See FIG. 7. The curved light lock rib 66 of the sacrificial bottom portion 62 (like the identical curved light lock rib 54 of the bottom portion 44 of the main body part 12 that was cut away) cooperates with the curved light lock rib 52 of the new rear cover part 16 and the curved light lock rib 56 of the new front cover part 14 to form a labyrinth light-trap that light-tightly seals the cartridge receiving chamber 18.

When recycling of the one-time-use camera 10 is completed. It is ready to be used again.

After the recycled camera 10 is used, the sacrificial bottom portion 62 can first be cut off spaced from the attachment edge 60 when the corresponding bottom portions 40 and 42 of the new front and rear cover parts 14 and 16 are cut off to make the bottom-most opening 46 for removing the fresh cartridge 68 from the cartridge receiving chamber 18. Then, the fresh cartridge 68 is removed from the cartridge receiving chamber 18, and the remainder of the sacrificial bottom portion 62 is separated from the attachment edge to allow another sacrificial bottom portion to be assembled to the main body part 12.

The invention has been described with reference to a preferred embodiment. However, it will be appreciated that variations and modifications can be effected by a person of ordinary skill in the art without departing from the scope of the invention. For example, the one-time-use camera 10 originally can include the attachment edge 60 and the sacrificial bottom portion 62. This simplifies matters because there is no need for a second cut to form the attachment edge 60.

PARTS LIST 10. one-time-use camera
12. main body part
14. front cover part
16. rear cover part
18. cartridge receiving chamber
20. film cartridge
22. film supply chamber
24. film supply spool
26. filmstrip
28. unexposed film roll
30. backframe opening
32. front aperture
34. film winding thumbwheel
36. slot
38. exposed top end of film take-up spool
40. bottom portion of front cover part
42. bottom portion of rear cover part
44. bottom portion of main body part
46. bottom-most opening
48. jagged cut-edge
50. curved wall
52. curved light lock rib
54. curved light lock rib
56. curved light lock rib
58. further bottom portion
60. attachment edge
62. sacrificial bottom portion
64. curved groove
66. curved light lock rib
68. fresh cartridge

What is claimed is:

1. A method of recycling a spent one-time-use camera that originally includes a pair of front and rear cover parts and a main body part having a chamber for a film cartridge, and which has had corresponding bottom portions of the front and rear cover parts and the main body part cut off to provide an opening for removing the film cartridge from the chamber, said method of recycling comprising the steps:

cutting off a further portion of the main body part in the vicinity of the first cut that was made to provide the opening for removing the film cartridge from the chamber, in order to provide an attachment edge along the main body part;

assembling a sacrificial bottom portion to the main body part at the attachment edge to replace the bottom and further portions that were cut off the main body part;

loading a fresh cartridge in the chamber; and assembling new front and rear cover parts without corresponding bottom portions being cut off to the main body part, in order to complete a recycled camera, whereby after the recycled camera is used the sacrificial bottom portion can first be cut off spaced from the attachment edge when the corresponding bottom portions of the new front and rear cover parts are cut off and the remainder of the sacrificial bottom portion can then be separated from the attachment edge to allow another sacrificial bottom portion to be assembled to the main body part.

2. A method as recited in claim 1, wherein the sacrificial bottom portion when assembled to the main body part at the attachment edge is engaged removably with the main body part to permit the sacrificial bottom portion to be readily separated from the attachment edge.

3. A recyclable one-time-use camera comprising a main body part having a chamber for a film cartridge, and a pair of front and rear cover parts that house said main body part between them, is characterized in that:

a sacrificial bottom portion of said main body part is engaged with the main body part at an attachment edge of said main body part to form a bottom-most portion of said chamber, and can be disengaged from said attachment edge to permit another sacrificial bottom portion to be engaged with said main body part at said attachment edge, whereby to unload said film cartridge from said chamber and recycle said camera said sacrificial bottom portion can first be cut off spaced from said attachment edge when corresponding bottom portions of said front and rear cover parts are cut off to provide an opening for removing said film cartridge from said chamber and the remainder of said sacrificial bottom portion can then be disengaged from said attachment edge to allow another sacrificial bottom portion to be connected to said main body part.

4. A recyclable one-time-use camera as recited in claim 3, wherein said main body part has a curved wall that defines said chamber and includes said attachment edge, and said sacrificial bottom portion is curved in conformity with said wall to connect to said wall.

5. A recyclable one-time-use camera as recited claim 3, wherein said sacrificial bottom portion connects with said front and rear cover parts to form a labyrinth light-trap to light-tightly seal said chamber.

6. A method of recycling a spent one-time-use camera that originally includes a pair of front and rear cover parts and a main body part having a chamber for a film cartridge, and which has had corresponding bottom portions of the front and rear cover parts and the main body part cut off to provide an opening for removing the film cartridge from the chamber, said method of recycling comprising the steps:

separating a further portion of the main body part in the vicinity of the first cut that was made to provide the opening for removing the film cartridge from the chamber, in order to reveal an attachment edge along the main body part;

assembling a replacement bottom portion to the main body part at the attachment edge in place of the bottom and further portions that were cut off the main body part;

loading a fresh cartridge in the chamber; and assembling new front and rear cover parts without corresponding bottom portions being cut off to the main body part, in order to complete a recycled camera.

* * * * *